Oct. 10, 1950 N. P. BORETTI 2,524,878
LUBRICATOR FOR PNEUMATIC TOOLS
Filed Jan. 20, 1947 2 Sheets-Sheet 1

INVENTOR.
Napoleon P. Boretti
BY
ATTORNEYS

Oct. 10, 1950  N. P. BORETTI  2,524,878
LUBRICATOR FOR PNEUMATIC TOOLS
Filed Jan. 20, 1947  2 Sheets-Sheet 2
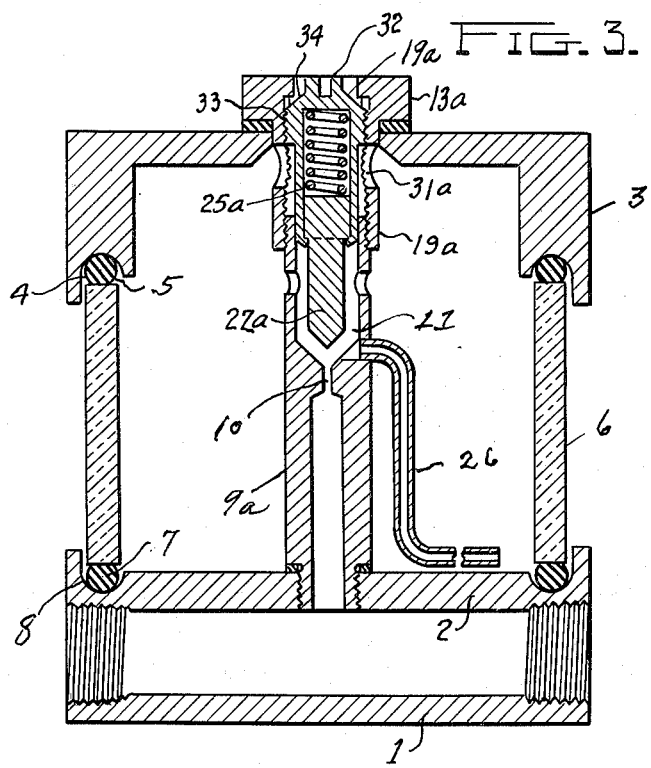
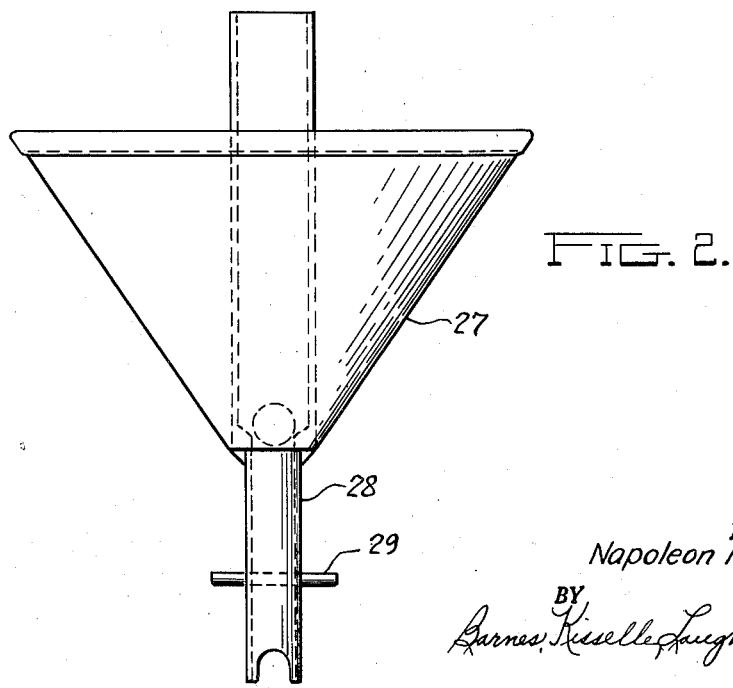
INVENTOR.
Napoleon P. Boretti
BY
Barnes, Kisselle, Laughlin & Raisch
ATTORNEYS Patented Oct. 10, 1950

2,524,878

UNITED STATES PATENT OFFICE 2,524,878

LUBRICATOR FOR PNEUMATIC TOOLS

Napoleon P. Boretti, Detroit, Mich., assignor to General Motors Corporation, Detroit, Mich., a corporation of Delaware Application January 20, 1947, Serial No. 723,075

8 Claims. (Cl. 184—55)

This invention relates to lubricators for reciprocating tools, that is, tools of the type where the fluid pressure is on and off at considerable intervals.

The conventional lubricator for pneumatically-operated devices is not very successful with welding guns for the reason that the pressure through the lubricator is not a continuous one but is on and off at irregular and considerably spaced intervals. Under these conditions often not enough fluid finds its way into the tool to properly lubricate it, and damage results. Furthermore, most if not all of these lubricators have a constriction —a venturi—in the main air line to the tool. This creates objectionable back pressure in the line.

It is the object of the present invention to provide a lubricating device for a tool where the pressure is irregularly on and off which will adequately feed oil to the tool, and which provides no obstruction in the line to create objectionable back pressure. To this end I provide a lubricator which has a venturi at the side of the main air feed line and this venturi atomizes the oil by acting upon a small diameter tube whose length and diameter are calculated to give the proper feed of oil. When the cylinder in the air gun is opened to the air line there will be a sudden drop of pressure in the lubricator, and this will cause an out-rush of air in the lubricator, carrying with it the atomized oil in suspension and the oil that has collected on parts of the lubricator. This will more fully appear from the description that follows.

Referring to the drawings:

Fig. 2 is an elevation of the oil feeding funnel used with this form of lubricator.

Fig. 3 is a vertical section of another form of my invention.

Figure 1:
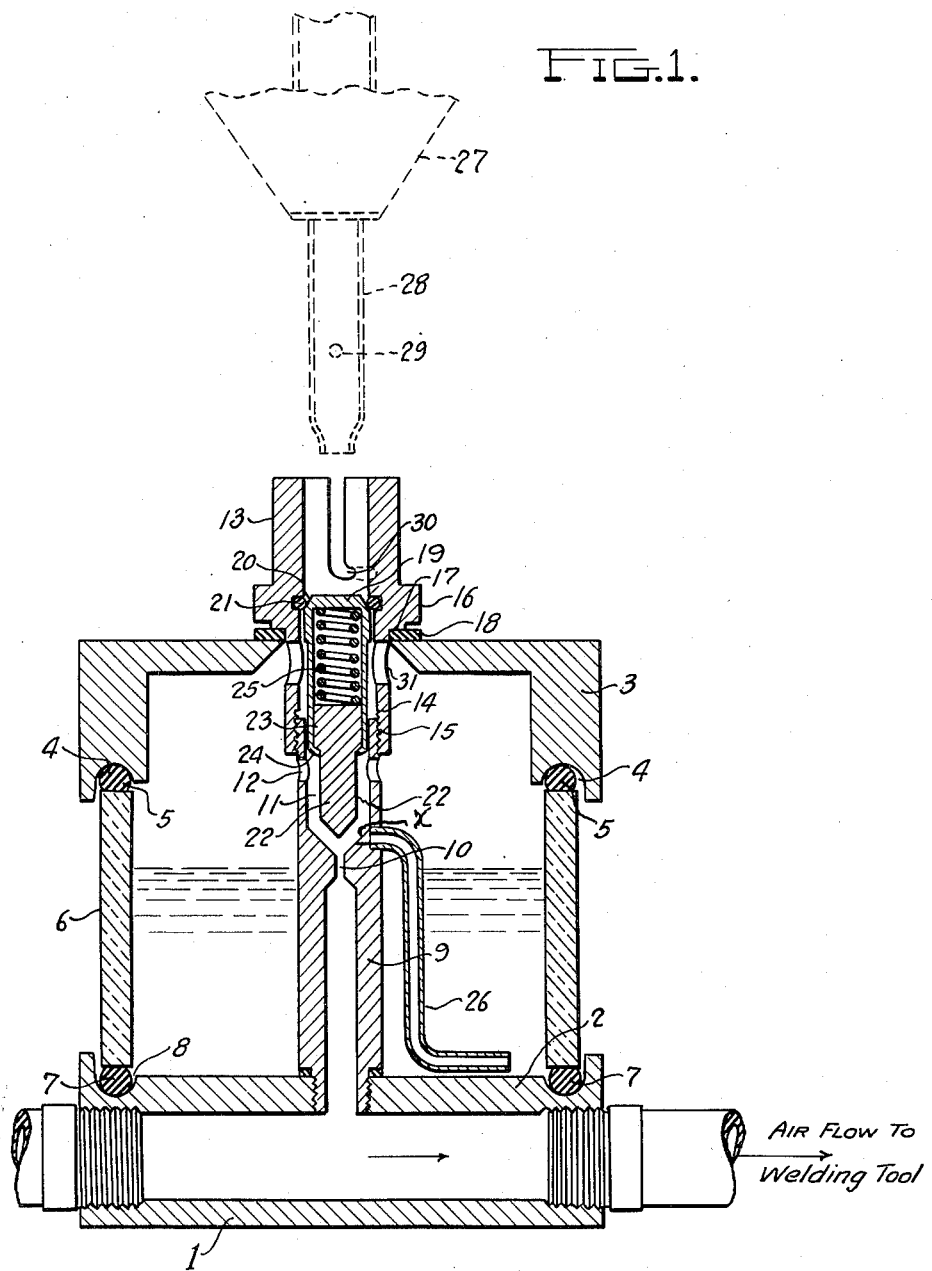
Fig. 1 is a vertical section of one form of my lubricator.

1 is a pipe fitting in the form of a casting which also forms the bottom 2 of the lubricator. An inverted cup-like head 3 has a groove 4 which engages the rubber sealing ring 5 which fits over the glass or transparent plastic tube 6 which forms the side wall of the lubricator and the side wall of the oil reservoir. The bottom of this glass engages the sealing ring 7 that fits in groove 8 in the bottom wall of the lubricator. The stand pipe 9 screws into the bottom wall 2 and this is provided with a Venturi opening 10 which leads into the larger diameter chamber 11 of tube 9. Orifices 12 lead from this enlarged chamber to the space above the oil level in the reservoir. A tubular plug 13 has interior threads 14 that screw over the exterior threads 15 of stand pipe 9. A wrench can be put on the portion 16 for screwing this plug in place and the plug has a shoulder 17 that screws down against the washer 18 to seal the joint with the top of the reservoir. Within this tubular plug is a reciprocating compound plunger 19. The outside portion of this plunger is chamfered at 20 to bear against the sealing ring 21. Inside of the outside section 19 is a plunger 22 which has an enlarged head 23 adapted to encounter the turned-over edges 24 of the outer plunger to hold the inner plunger in assembly in the outer plunger. A coiled compression spring 25 tends to press the inner section lengthwise the outer section to the limit of its movement.

A small diameter tube 26 leads from the bottom of the oil reservoir up to the low pressure side of the venturi 10. This small diameter tube is in the neighborhood of $\tfrac{3}{32}$ O. D., or .09375 of an inch, and is or approaches the dimensions of a "capillary" tube, and it is well known that the feed through a small diameter tube varies with the length and diameter. Consequently, by selecting the proper diameter and the proper length of tube the amount of oil feed desired may be obtained. This is much more desirable than an adjustable needle valve which controls a very small orifice and the orifice often becomes clogged with foreign matter or congealed liquid. A tube of fairly good dimensions can be selected and at the same time it will provide sufficient frictional resistance to the passage of the liquid therethrough by reason of its length and diameter so as to give the necessary obstruction without interfering with the proper feed.

When the valve in the welding gun (not shown) is opened this presents an outlet for the air in the feed line and, consequently, there will be a momentary drop of the air pressure in the line and also in the oil reservoir. This will carry out air and atomized oil in suspension above the liquid level in the reservoir. The out-rush of air will also carry any oil that has accumulated on the wall of the enlarged chamber 11 in the stand pipe 9. When the welding gun electrode has met the work and the pressure again builds up in the gun and in the air line there will be a rush of air through the venturi 10 and this will create a rarified atmosphere at the point X at the mouth of the small diameter tube. This will aspirate the oil out of the tube and atomize it, throwing some of it against the wall of the enlarged chamber 11 and some of it will pass out through the ports 12 into the air chamber above the liquid level of the reservoir. When the valve in the air gun is again opened to allow entry of air into the gun to bring the electrodes again in contact with the work, this will momentarily reduce the pressure in the oil reservoir and cause the suspended oil and air to rush back through the venturi, picking up some of the globular oil clinging to the walls of the enlarged chamber 11. This will find its way into the main air stream and then into the welding gun.

The lubricator can be replenished with oil while the tool is being worked without interfering with the operation of the tool. A funnel 27 has a long discharge spout 28 with a bayonet pin 29 extending out each side. This funnel with the spout may be pressed down against the compound plunger 19. This will press the inner plunger or large needle valve 22 down against the Venturi opening and close that opening off from the main conduit. The funnel may then be turned to lock the pin 29 in the bayonet notch 30 and this will hold the funnel in place and at the same time it will close off the communication between the air reservoir and the main air pressure conduit. Oil may then be leisurely poured into the funnel and it will pass out through the ports 31 into the oil reservoir. The level can be observed through the transparent wall of the reservoir and the filling discontinued when the desired level is reached.

The form of the invention shown in Fig. 3 is substantially the same. The operation is the same as shown in Fig. 1, except in place of the compound plunger operated by the funnel and bayonet lock, a screw plug 19a is provided. A screw driver is placed in the screw driver slot 32 of the plug and this plug is turned down by means of the threads 33 between the plug and the cap 13a. This plug is turned down until the chamfered end 34 of the plug comes opposite the ports 31a in the cap 13a. Thereupon a passage is afforded from the exterior of the cap down around the plug through the ports 31a to the oil reservoir. At the same time the inner plunger or large needle valve 22a has been seated upon the mouth of the Venturi opening to close off communication with the main air line. Oil may be poured in over the screw plug until the proper level is observed through the transparent wall of the reservoir. The operation of this form of the invention, so far as the atomization of the oil and the carriage of the atomized oil off the walls into the main air line is concerned, is exactly the same as with the form shown in Figs. 1 and 2, and, therefore, the mode of operation needs no further explanation.

What I claim is:

1. A lubricator for pneumatic tools, particularly those tools of the off and on variety wherein a uniform pressure in the air line does not obtain, said lubricator being arranged to be used with a fluid pressure conduit leading to the tool, and having in combination an oil reservoir with an air chamber above the oil level, a standpipe having a passageway for leading from a section of the air conduit to the air chamber above the oil level in the reservoir, said passageway having a constriction (venturi), an oil line leading from the lower portion of the oil reservoir to the upper portion of the said passageway above the constriction (venturi), air flowing to said chamber through the passageway and constriction when the operation of the tool causes air pressure to build up in the pressure conduit aspirating oil out of said oil line and atomizing same in said chamber above the oil level in said reservoir, whereby upon the opening of the air valve leading to the tool momentary drop of pressure in the pressure line will occur, causing the air in the reservoir above the oil level together with the oil in suspension therein to be swept back through the said passageway into the main air line, together with oil accumulating on the walls of the chamber.

2. The combination claimed in claim 1 in which the oil line comprises a small diameter tube whose diameter and length is calculated to give the proper oil feed without other control means.

3. The combination claimed in claim 1 in which the fluid pressure conduit section and the passageway and the constriction (venturi) comprises a fitting having a tubular member to serve as an air conduit section into which is secured a stand pipe which forms the communication line to the upper portion of the oil reservoir and which has a constricted interior to form the venturi.

4. The combination claimed in claim 1 in which the oil reservoir, the pressure conduit section, the said chamber above the oil level in the oil reservoir and the passageway with the constriction comprises a fitting having a tubular portion that forms the conduit section, and which also forms the bottom of the oil reservoir, a stand pipe secured in said fitting and provided with discharge orifices and a hollow interior with a constricted portion which forms the venturi leading to the chamber above the oil in the reservoir, a glass tube having a sealed connection with said fitting which forms the lower portion of the reservoir and a cap fitted over and sealed to the top of the glass tube to form the top of the reservoir.

5. The combination claimed in claim 1 in which the oil reservoir, the pressure conduit section, the said passageway to the chamber above the oil in the oil reservoir and the constriction (venturi) comprises a fitting having a tubular portion that forms the conduit section and which also forms the bottom of the oil reservoir, a stand pipe secured in said fitting and provided with discharge orifices and a hollow interior with a constricted portion which forms the venturi leading to the air chamber in the oil reservoir, a glass tube having a sealed connection with said fitting which forms the bottom of the reservoir and a cap fitted over and sealed to the top of the glass tube to form the top of the reservoir, the said cap provided with means which can be manipulated to close off the passageway to the pressure conduit and which will open a passage for oil from the exterior to the interior of the reservoir.

6. The combination claimed in claim 1 in which the oil reservoir, the pressure conduit section, the said passageway to the air chamber in the oil reservoir and the venturi comprises a fitting having a tubular portion that forms the conduit section and which also forms the bottom of the oil reservoir, a stand pipe secured in said fitting and provided with discharge orifices and a hollow interior with a constricted portion which forms the passageway and venturi leading to the air chamber in the upper part of the oil reservoir, a glass tube having a sealed connection with said fitting which forms the bottom of the reservoir and a cap fitted over and sealed to the top of the glass tube to form the top of the reservoir, the said cap provided with means which can be manipulated to close off communication with the pressure conduit and which will open a passage for oil from the exterior to the interior of the reservoir, said means comprising a plug and a compound plunger including an outer and inner member, one telescoping in the other and the inner member projected outwardly by a spring.

7. The combination claimed in claim 1 in which the oil reservoir, the pressure conduit section, the said passageway to the air chamber in the upper part of the oil reservoir and the venturi comprises a fitting having a tubular portion that forms the conduit section and which also forms the bottom of the oil reservoir, a stand pipe secured in said fitting and provided with discharge orifices and a hollow interior with a constricted portion which forms the passageway with the constriction (venturi) leading to the air chamber in the oil reservoir; a glass tube having a sealed connection with said fitting which forms the bottom of the reservoir and a cap fitted over and sealed to the top of the glass tube to form the top of the reservoir, the said cap provided with means which can be manipulated to close off communication with the air pressure conduit and which will open a passage for oil from the exterior to the interior of the reservoir, said means comprising a plug and a compound plunger including an outer and inner member, one telescoping in the other and the inner member projected outwardly by a spring, the said plug being a screw plug which can be turned down to cause the inner compound pressure member to cut off communication with the pressure conduit and to expose an opening from the exterior to the interior of the reservoir to permit filling with oil.

8. The combination claimed in claim 1 in which the oil reservoir, the pressure conduit section, the said passageway to the air chamber in the upper part of the oil reservoir and the venturi comprises a fitting having a tubular portion that forms the conduit section and which also forms the bottom of the oil reservoir, a stand pipe secured in said fitting and provided with discharge orifices and a hollow interior with a constricted portion which forms the venturi leading to the upper portion or air chamber of the oil reservoir, a glass tube having a sealed connection with said fitting which forms the bottom of the reservoir and a cap fitted over and sealed to the top of the glass tube to form the top of the reservoir, the said cap provided with means which can be manipulated to close off communication with the pressure conduit and which will open a passage for oil from the exterior to the interior of the reservoir, said means comprising a plug and a compound plunger including an outer and inner member, one telescoping in the other, and the inner member projected outwardly by a spring, the said plug being a plug that screws down against the said cap by means of a threaded engagement with the top of the stand pipe, the said plug having a bayonet slot and notch for use with a funnel having a spout with bayonet pins, the said funnel and spout being arranged to project the compound plunger downwardly to cause the inner spring pressed portion to seal the communication with the pressure conduit and to open a passage for oil to the interior of the reservoir, the said funnel being rotatable when the bayonet pins are in the bayonet slots to engage the pins in the notch and lock the funnel in position.

NAPOLEON P. BORETTI.

REFERENCES CITED

The following references are of record in the file of this patent:

UNITED STATES PATENTS

| Number | Name | Date |
|---|---|---|
| 1,940,481 | Arnold | Dec. 19, 1933 |
| 2,233,700 | Norgren | Dec. 3, 1940 |